(12) United States Patent
Studer

(10) Patent No.: US 9,353,771 B2
(45) Date of Patent: May 31, 2016

(54) MULTIPLE-STAGE VALVE SYSTEM

(75) Inventor: Roger Studer, Balterswil (CH)

(73) Assignee: Norgren GmbH, Alpen (DE)

( * ) Notice: Subject to any disclaimer, the term of this patent is extended or adjusted under 35 U.S.C. 154(b) by 624 days.

(21) Appl. No.: 13/513,644

(22) PCT Filed: Dec. 17, 2010

(86) PCT No.: PCT/EP2010/007728
§ 371 (c)(1),
(2), (4) Date: Jun. 4, 2012

(87) PCT Pub. No.: WO2011/079916
PCT Pub. Date: Jul. 7, 2011

(65) Prior Publication Data
US 2012/0241012 A1    Sep. 27, 2012

Related U.S. Application Data

(60) Provisional application No. 61/287,791, filed on Dec. 18, 2009.

(51) Int. Cl.
| | | |
|---|---|---|
| *B29C 49/12* | (2006.01) | |
| *F15B 13/042* | (2006.01) | |
| *B29C 49/06* | (2006.01) | |
| *B29K 67/00* | (2006.01) | |
| *B29C 49/42* | (2006.01) | |

(52) U.S. Cl.
CPC ............. *F15B 13/0426* (2013.01); *B29C 49/06* (2013.01); *B29C 49/12* (2013.01); *B29C 49/4289* (2013.01); *B29K 2067/00* (2013.01); *Y10T 137/0318* (2015.04)

(58) Field of Classification Search
CPC .................................................. F15B 13/0426
USPC ....................... 251/26, 28, 29; 137/287.5, 488
See application file for complete search history.

(56) References Cited

U.S. PATENT DOCUMENTS

| | | | | |
|---|---|---|---|---|
| 2,373,654 | A * | 4/1945 | Beekley et al. ................. | 251/29 |
| 2,398,775 | A * | 4/1946 | Beekley et al. ................. | 251/26 |
| 6,095,184 | A * | 8/2000 | Neff et al. ...................... | 137/488 |
| 6,397,885 | B1 * | 6/2002 | Golden et al. ........... | 137/565.22 |
| 6,443,175 | B1 * | 9/2002 | Pabst .............................. | 251/26 |
| 2003/0019353 | A1 | 1/2003 | Vogel et al. | |

FOREIGN PATENT DOCUMENTS

| | | |
|---|---|---|
| DE | 10314867 A1 | 11/2004 |
| DE | 202009006684 U1 | 8/2009 |
| JP | 590001803 | 1/1984 |

OTHER PUBLICATIONS

EPO machine translation of DE 10314867.*

* cited by examiner

*Primary Examiner* — Eric Keasel
(74) *Attorney, Agent, or Firm* — The Ollila Law Group LLC

(57) ABSTRACT

A multiple-stage valve system (200) including a pilot fluid supply (209) and a process fluid supply (222) is provided. The multiple-stage valve system includes a first pilot valve (201) including a first port (206) in fluid communication with the pilot fluid supply and a second port (207) selectively in fluid communication with the first port. The multiple-stage valve system also comprises a second pilot valve (202). The second pilot valve can include a first port (213) in fluid communication with the process fluid supply and a second port (214) selectively in fluid communication with the first port. The second pilot valve also includes a first pressure-actuated biasing member (217) in fluid communication with the process fluid supply and a second pressure-actuated biasing member (218) in fluid communication with the second port of the first pilot valve. The multiple-stage valve system also comprises a main control valve (203). The main control valve can include a first port (220) in fluid communication with the process fluid supply and a second port (221) selectively in fluid communication with the first port. The main control valve can also include a first pressure-actuated biasing member (225) in fluid communication with the process fluid supply and a second pressure-actuated biasing (226) member in fluid communication with the second port of the second pilot valve.

13 Claims, 4 Drawing Sheets

MULTIPLE-STAGE VALVE SYSTEM

CROSS-REFERENCE TO RELATED APPLICATIONS

This is a National Stage entry of International Application No. PCT/EP2010/007728, with an international filing date of Dec. 17, 2010 which claims priority of U.S. provisional patent application No. 61/287,791, filed Dec. 18, 2009 entitled "Multiple-Stage Valve System".

TECHNICAL FIELD

The present invention relates to, valve systems, and more particularly, to a multiple-stage valve system operable to actuate a pressure-actuated valve.

BACKGROUND OF THE INVENTION

Pilot actuated valve systems are generally known in the art and can be utilized in a wide variety of applications. In some applications, pilot valves are utilized to control a pilot fluid that is used to actuate a pressure-actuated main control valve. Pressure-actuated valves typically comprise a biasing piston or other element that actuates the valve when acted upon by a pressurized fluid supply. Generally, pilot valves control a pilot fluid that is at a pressure much less than a pressure of the operating process fluid controlled by the main control valve. By utilizing a pilot fluid with a lower pressure than a pressure of the process fluid being controlled by the main control valve, less force is required to actuate the pilot valve. This is especially true in situations where the pilot valve comprises a solenoid-actuated pilot valve. In some circumstances, the power supplied to the solenoid-actuated pilot valve may be limited in order to reduce power consumption and thus, costs, or because of certain power regulations prescribed by a government or other regulatory agency. The pilot fluid may comprise a pneumatic fluid, a hydraulic fluid, etc. The particular fluid used as the pilot fluid may depend on the particular application.

One particular use of pilot-actuated valve systems is in the control of process gas for blow molding systems. Blow molding is a generally known process for molding a preform part into a desired product. The preform is in the general shape of a tube with an opening at one end for the introduction of a pressurized gas, typically air; however, other gases may be used. One specific type of blow molding is stretch blow molding (SBM). In SBM applications, a valve block provides both low and high-pressure gas to expand the preform into a mold cavity. The mold cavity comprises the outer shape of the desired product. SBM can be used in a wide variety of applications; however, one of the most widely used applications is in the production of Polyethylene terephthalate (PET) products, such as drinking bottles. Typically, the SBM process uses a low-pressure fluid supply along with a stretch rod that is inserted into the preform to stretch the preform in a longitudinal direction and radially outward and then uses a high-pressure fluid supply to expand the preform into the mold cavity. Each of the low-pressure and high-pressure fluid supplies can be controlled using a multiple-stage valve system. The resulting product is generally hollow with an exterior shape conforming to the shape of the mold cavity. The gas in the preform is then exhausted through one or more exhaust valves. This process is repeated during each blow molding cycle.

As can be appreciated, with the high speed of the molding cycle that is currently achievable, even small losses in energy during each molding cycle can result in substantial increases in operating costs. As a result, the valve system typically uses a multiple-stage valve system that includes a two-stage pilot valve system to control a main control valve. The two-stage pilot system is generally preferable over a single-stage pilot system in order to minimize the power required by the solenoid valve. One example of a prior art multiple-stage valve system is shown in FIG. 1.

FIG. 1 shows a schematic of a prior art multiple-stage valve system 100. As can be appreciated many of the details of the valve system 100 are omitted in order to simplify the schematic. As shown, the multiple-stage valve system 100 comprises a two-stage pilot system to control a main control valve 103. The multiple-stage valve system 100 comprises a first pilot valve 101, a second pilot valve 102, and the main control valve 103. While the first and second pilot valves comprise 3/2 (three ports, two positions) valves and the main control valve 103 comprises a 2/2 valve, other configurations are known. As can be appreciated, the main control valve 103 can be actuated as described below in order to control a process fluid supply. When the two-stage pilot valve system 100 is used in SBM applications, the main control valve 103 can be used to control a process fluid supply to/from the mold cavity (not shown), for example.

According to the prior art valve system 100, the first pilot valve 101 comprises a spring biased, solenoid-actuated 3/2 valve. The first pilot valve 101 includes a solenoid 104, a spring return 105, a supply port 106, a pilot port 107, and an exhaust port 108. According to the prior art system 100, the supply port 106 can communicate with a pilot fluid supply 109 via a conduit 110. The pilot port 107 can communicate with the second pilot valve 102 via a conduit 111. In the schematic shown, when the solenoid 104 is de-actuated, the spring 105 biases the first pilot valve 101 towards a first position. In the first position, the supply port 106 is closed off from the pilot port 107 while the pilot port 107 can communicate with the exhaust port 108. As a result, fluid pressure in the conduit 111 can exhaust through the exhaust port 108.

As can be seen, a conduit 112 is provided, which branches off from the conduit 110 that is in fluid communication with the pilot pressure supply 109. The conduit 112 provides a fluid communication path between the conduit 110 and the supply port 113 of the second pilot valve 102. A conduit 116 is also provided. The conduit 116 branches off from the conduit 112 and provides fluid communication between the conduit 112 and a first biasing piston 117 of the second pilot valve 102. As is generally known in the art, pressure-actuated valves, such as the pressure-actuated valves 102, 103 can include biasing members, such as the biasing piston 117. Fluid pressure can act on the biasing pistons in order to actuate the valve. The cross-section of the biasing piston along with the pressure of the fluid acting on the biasing piston determines the force that actuates the valve.

In the prior art multiple-stage valve system 100 shown in FIG. 1, the second pilot valve 102 comprises a first biasing piston 117 and a second biasing piston 118. As can be seen, pressure acts on the first biasing piston 117 whenever fluid is provided from the pilot pressure supply 109. As a result, when the solenoid 104 is de-actuated, the second pilot valve 102 is actuated to a first position by the fluid acting on the first biasing piston 117 from the conduit 116. When the second pilot valve 102 is in the first position, the supply port 113 is closed off from the pilot port 114 and the pilot port 114 is in fluid communication with the exhaust port 115. Similarly, the main control valve 103 is actuated to a first position by fluid acting on a first biasing piston 125 from a conduit 124 that branches off from a process fluid conduit 123. As shown, the process fluid conduit 123 is in fluid communication with a process fluid supply 122.

Upon actuating the solenoid 104, the first pilot valve 101 is actuated to a second position where the supply port 106 can communicate with the pilot port 107. In the second position, the pressure delivered from the pilot fluid supply 109 can communicate with the second biasing piston 118 of the second pilot valve 102 via conduit 110, the supply port 106, the pilot port 107, and the conduit 111. With the pilot fluid supply 109 in fluid communication with the second biasing piston 118, the second pilot valve 102 can be actuated to a second position. This is typically possible by providing the second biasing piston 118 with a larger cross-sectional area than the first biasing piston 117. As a result, even if flow in the conduit 111 is less than flow in the conduit 116, due to for example, a smaller nominal bore in the first pilot valve 101, the force provided by the pilot fluid acting on the second biasing piston 118 can be larger than the force provided by the pilot fluid acting on the first biasing piston 117. In some prior art systems, the first and second pistons 117, 118 may be coupled via a common spool, for example.

As the second pilot valve 102 is actuated to the second position, the exhaust port 115 is closed off from the pilot port 114 and the supply port 113 is brought into fluid communication with the pilot port 114. With the pilot port 114 in fluid communication with the supply port 113, pilot fluid can act on the main control valve 103 via the conduit 119. According to the prior art valve system 100, the conduit 119 provides a fluid communication path between the pilot port 114 of the second pilot valve 102 and a second biasing piston 126 of the main control valve 103.

As can be seen, the main control valve 103 comprises a fluid actuated 2/2 valve with a first fluid port 120 and a second fluid port 121. The main control valve 103 controls the flow of a pressurized process fluid from the process fluid source 122 via the conduit 123. The main control valve 103 also includes another conduit 124 that branches off from the conduit 123. The conduit 124 provides a fluid communication path between the conduit 123 and the first biasing piston 125 of the main control valve 103. Therefore, the conduit 124 provides pressure to the first biasing piston 125 in order to actuate the main control valve 103 to a first position. As shown, in the first position, the first and second ports 120, 121 are in fluid communication with one another and therefore, process fluid from the process fluid supply 122 can be delivered through the main control valve 103.

As mentioned above, upon actuating the solenoid 104, pressurized pilot fluid is provided through the second pilot valve 102 to a second biasing piston 126 of the main control valve 103. With the pilot fluid acting on the second biasing piston 126, the main control valve 103 is actuated to a second position where the first and second ports 120, 121 are closed off from one another.

A two-stage pilot system, such as used in the multiple-stage valve system 100 may be desired for a number of reasons. One reason for providing a two-stage pilot system is to increase the pressure applied to the main control valve 103 while minimizing the power required to actuate the solenoid 104. For example, the nominal bore size of the first pilot valve 101 may be much smaller than the nominal bore size of the second pilot valve 102. As a result, the flow through the first pilot valve 101 may be restricted thereby decreasing the power required to actuate the first pilot valve 101. This allows a pilot fluid with a higher pressure while minimizing the size of the solenoid 104. The size of the first and second biasing pistons 117, 118 can simply be adjusted in order to allow the force of the pressure acting on the second biasing piston 118 to overcome the force of the pressure acting on the first biasing piston 117. The nominal bore size of the second pilot valve 102 can be increased in order to allow a greater flow rate through the second pilot valve 102 thereby allowing a greater flow to be applied to the second biasing member 126 of the main control valve 103.

While a multiple-stage valve system may be desirable in some circumstances, the prior art multiple-stage valve system 100 has a number of drawbacks. One drawback is that due to a difference in pressure between the process fluid supply 122 and the pilot fluid supply 109, the second biasing piston 126 is required to have a relatively large cross-sectional area compared to the first biasing piston 125 of the main control valve 103. This is because the force provided by the pressurized pilot fluid acting on the second biasing piston 126 is required to be greater than the force provided by the pressurized process fluid acting on the first biasing piston 125. The enlarged cross-section required for the second biasing piston 126 results in a much larger valve block, thereby significantly increasing the cost associated with manufacturing the valve system 100. Further, if there is a change in either the pressure of the process fluid supply or the pilot fluid supply, the ratio of the cross sectional area of the first biasing piston 125 to the second biasing piston 126 may no longer provide the desired forces required to properly and efficiently actuate the valves. Therefore, the prior art two-stage pilot valve system 100 shown in FIG. 1 is susceptible to problems due to variations in pressure.

The present invention overcomes these and other problems and an advance in the art is achieved. The present invention provides a multiple-stage valve system that utilizes the process fluid rather than the pilot fluid to actuate the main control valve between two or more positions. As a result, the cross-sectional areas of the first and second biasing pistons can remain constant over a wide variety of pressures. Further, because substantially the same pressure acts on both the first and second biasing pistons of the main control valve, the cross-sectional area of the second biasing piston can be formed substantially smaller than in the prior art valve system 100. Therefore, the size of the valve block can be significantly reduced. Further, the present invention utilizes the process fluid to bias the second pilot valve in a first direction to a first position. The second pilot valve also controls the flow of the process fluid to the main control valve and not the pilot fluid as in prior art designs.

SUMMARY OF THE INVENTION

A multiple-stage valve system including a pilot fluid supply and a process fluid supply is provided according to an embodiment of the invention. The multiple-stage valve system includes a first pilot valve including a first port in fluid communication with the pilot fluid supply and a second port selectively in fluid communication with the first port. The multiple-stage valve system also comprises a second pilot valve. According to an embodiment of the invention, the second pilot valve includes a first port in fluid communication with the process fluid supply and a second port selectively in fluid communication with the first port. The second pilot valve also includes a first pressure-actuated biasing member in fluid communication with the process fluid supply and a second pressure-actuated biasing member in fluid communication with the second port of the first pilot valve. According to an embodiment of the invention, the multiple-stage valve system also comprises a main control valve. The main control valve can include a first port in fluid communication with the process fluid supply and a second port selectively in fluid communication with the first port. The main control valve can also include a first pressure-actuated biasing member in fluid communication with the process fluid supply and a second pressure-actuated biasing member in fluid communication with the second port of the second pilot valve.

A method for controlling a main control valve of a multiple-stage valve system including a pilot fluid supply and a process fluid supply is provided according to an embodiment of the invention. The method comprises steps of actuating a first pilot valve to a first position and exhausting pilot fluid in fluid communication with a second pressure-actuated biasing member of a second pilot valve through the first pilot valve. The method also comprises a step of supplying process fluid from the process fluid supply to a first pressure-actuated biasing member of the second pilot valve to actuate the second pilot valve to a first position. According to an embodiment of the invention, the method also comprises a step of exhausting process fluid in fluid communication with a second pressure-actuated biasing member of the main control valve through the second pilot valve. According to an embodiment of the invention, the method also comprises a step of supplying process fluid from the process fluid supply to a first pressure-actuated biasing member of the main control valve to actuate the main control valve to a first position.

ASPECTS

According to an aspect of the invention, a multiple-stage valve system including a pilot fluid supply and a process fluid supply comprises:
- a first pilot valve including a first port in fluid communication with the pilot fluid supply and a second port selectively in fluid communication with the first port;
- a second pilot valve including:
- a first port in fluid communication with the process fluid supply;
- a second port selectively in fluid communication with the first port;
- a first pressure-actuated biasing member in fluid communication with the process fluid supply;
- a second pressure-actuated biasing member in fluid communication with the second port of the first pilot valve;
- a main control valve including:
- a first port in fluid communication with the process fluid supply;
- a second port selectively in fluid communication with the first port;
- a first pressure-actuated biasing member in fluid communication with the process fluid supply; and
- a second pressure-actuated biasing member in fluid communication with the second port of the second pilot valve.

Preferably, the first pilot valve further includes a third port selectively in fluid communication with the second port.

Preferably, the second pilot valve further includes a third port selectively in fluid communication with the second port.

Preferably, the multiple-stage valve system further comprises a biasing member adapted to bias the first pilot valve towards a first position and a solenoid adapted to bias the first pilot valve towards a second position.

Preferably, the first pressure-actuated biasing member of the second pilot valve comprises a cross-sectional area smaller than a cross-sectional area of the second pressure-actuated biasing member of the second pilot valve.

Preferably, the first pressure-actuated biasing member of the main control valve comprises a cross-sectional area smaller than a cross-sectional area of the second pressure-actuated biasing member of the main control valve.

According to another aspect of the invention, a method for controlling a main control valve of a multiple-stage valve system including a pilot fluid supply and a process fluid supply comprises steps of:
- actuating a first pilot valve to a first position;
- exhausting pilot fluid in fluid communication with a second pressure-actuated biasing member of a second pilot valve through the first pilot valve;
- supplying process fluid from the process fluid supply to a first pressure-actuated biasing member of the second pilot valve to actuate the second pilot valve to a first position;
- exhausting process fluid in fluid communication with a second pressure-actuated biasing member of the main control valve through the second pilot valve; and
- supplying process fluid from the process fluid supply to a first pressure-actuated biasing member of the main control valve to actuate the main control valve to a first position.

Preferably, the method further comprises a step of communicating the process fluid supply from a first port of the main control valve to a second port of the main control valve when the main control valve is in the first position.

Preferably, the method further comprises a step of:
- actuating the first pilot valve to a second position to open a fluid communication path from the pilot fluid supply to the second pressure-actuated biasing member of the second pilot valve.

Preferably, the method further comprises a step of
- supplying process fluid to the second pressure-actuated biasing member of the second pilot valve to actuate the second pilot valve to a second position thereby opening a fluid communication path from the process fluid supply to the second pressure-actuated biasing member of the main control valve.

Preferably, the method further comprises a step of:
- supplying process fluid to the second pressure-actuated biasing member of the main control valve to actuate the main control valve to a second position.

Preferably, the step of actuating the first pilot valve to the second position comprises actuating a solenoid.

DETAILED DESCRIPTION OF THE INVENTION

Figure 1:
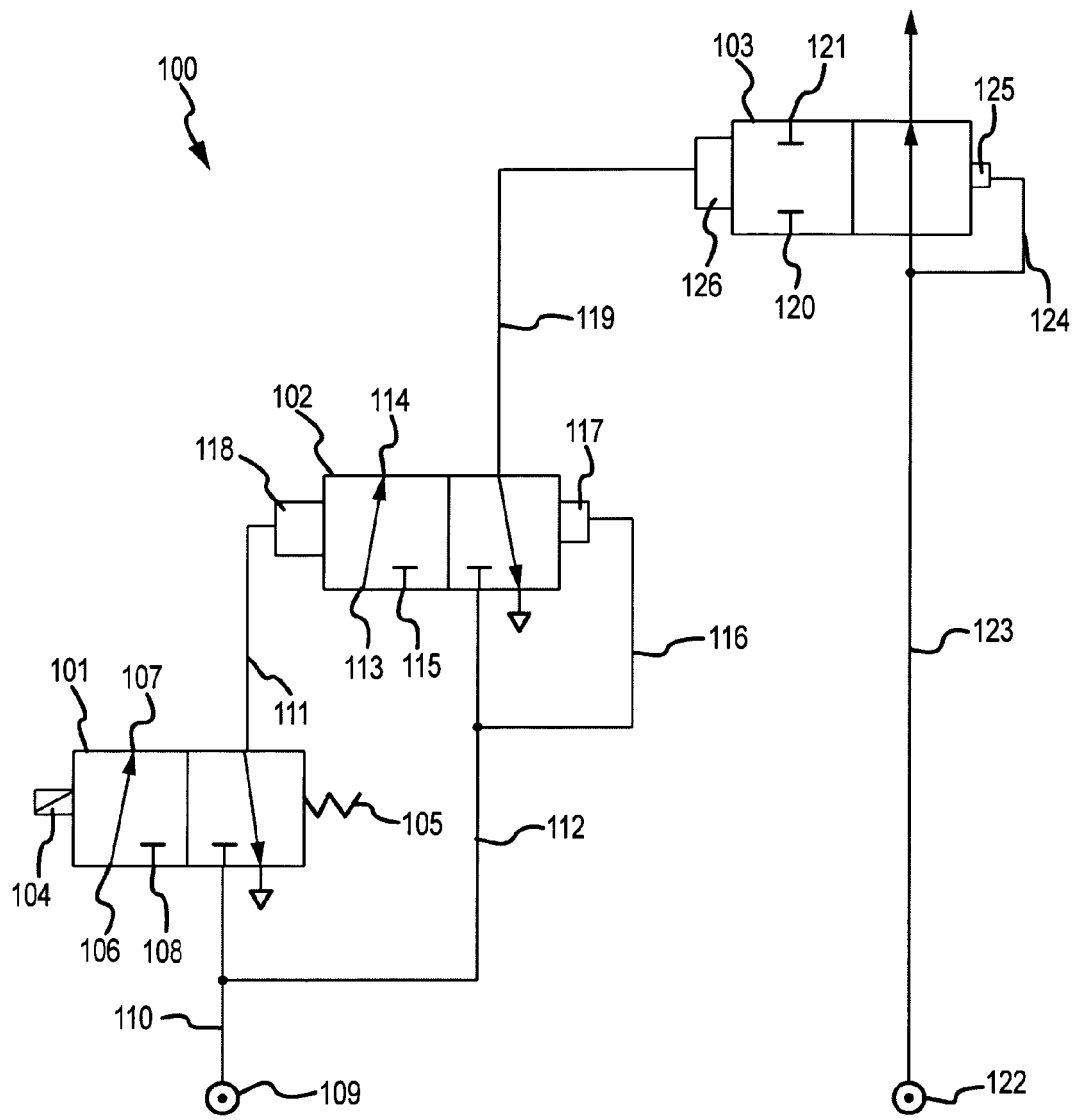
FIG. 1 shows a schematic of a prior art multiple-stage valve system.
Figure 2:
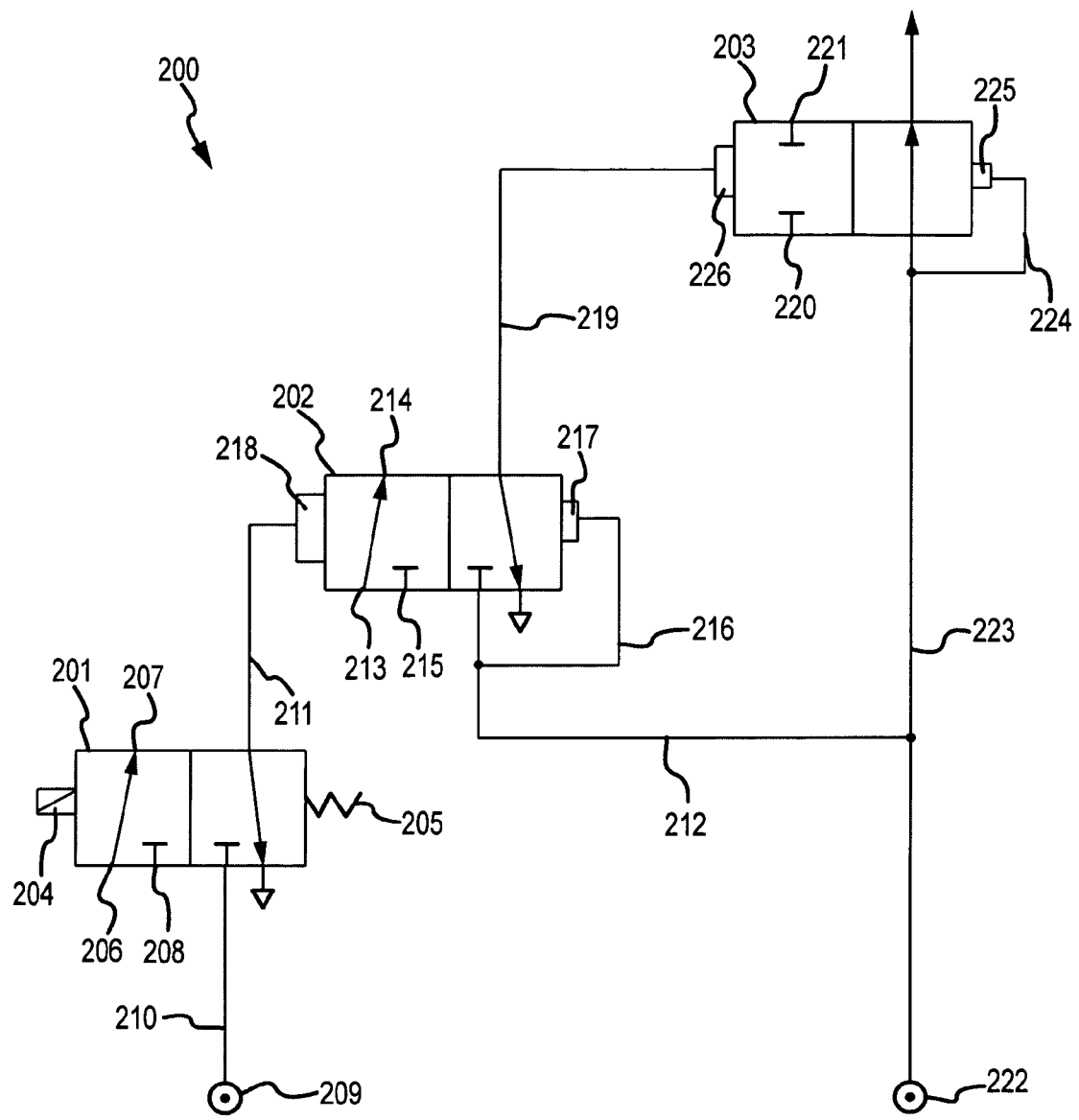
FIG. 2 shows a schematic of a multiple-stage valve system according to an embodiment of the invention.
Figure 3:
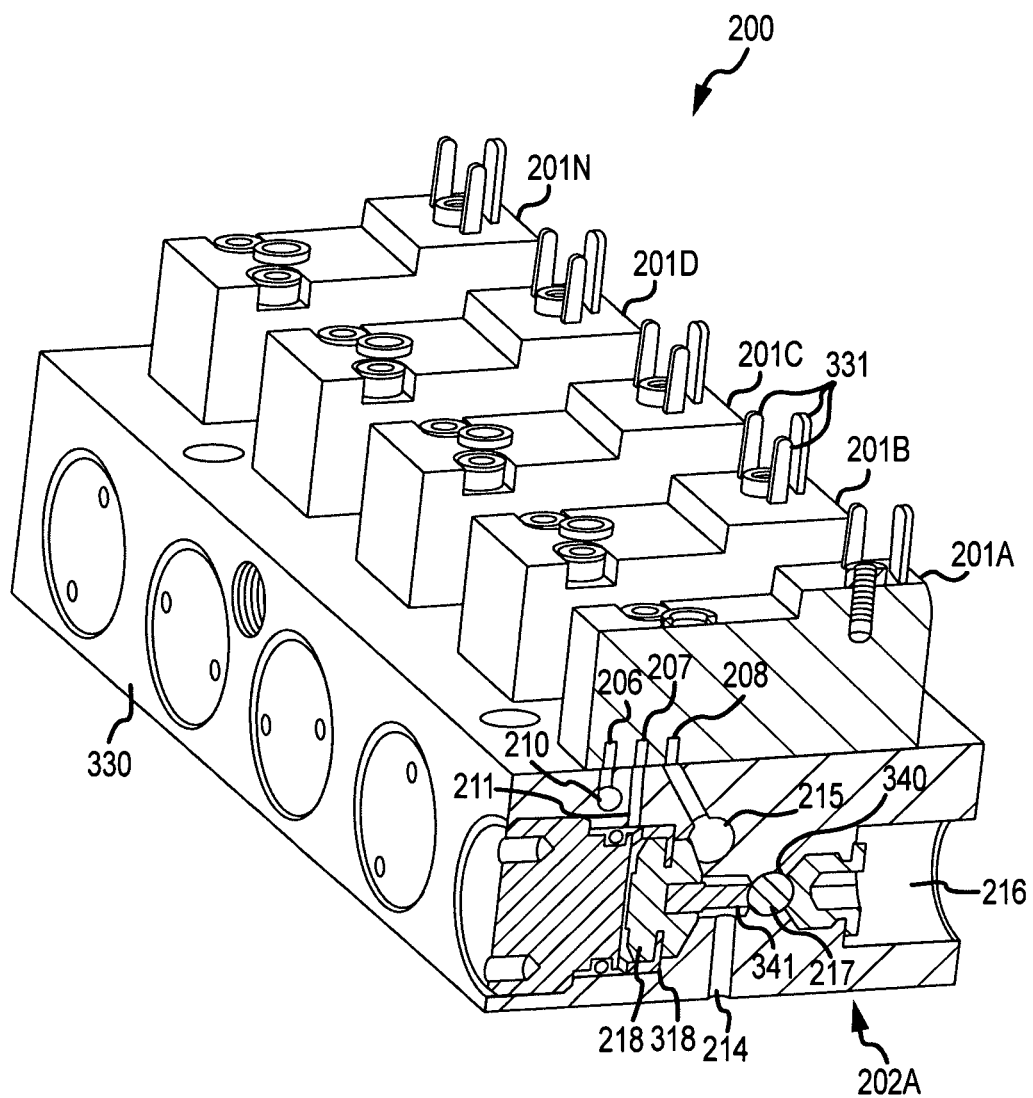
FIG. 3 shows a partial cross-sectional view of a valve block including a plurality of multiple-stage valve systems.
Figure 4:
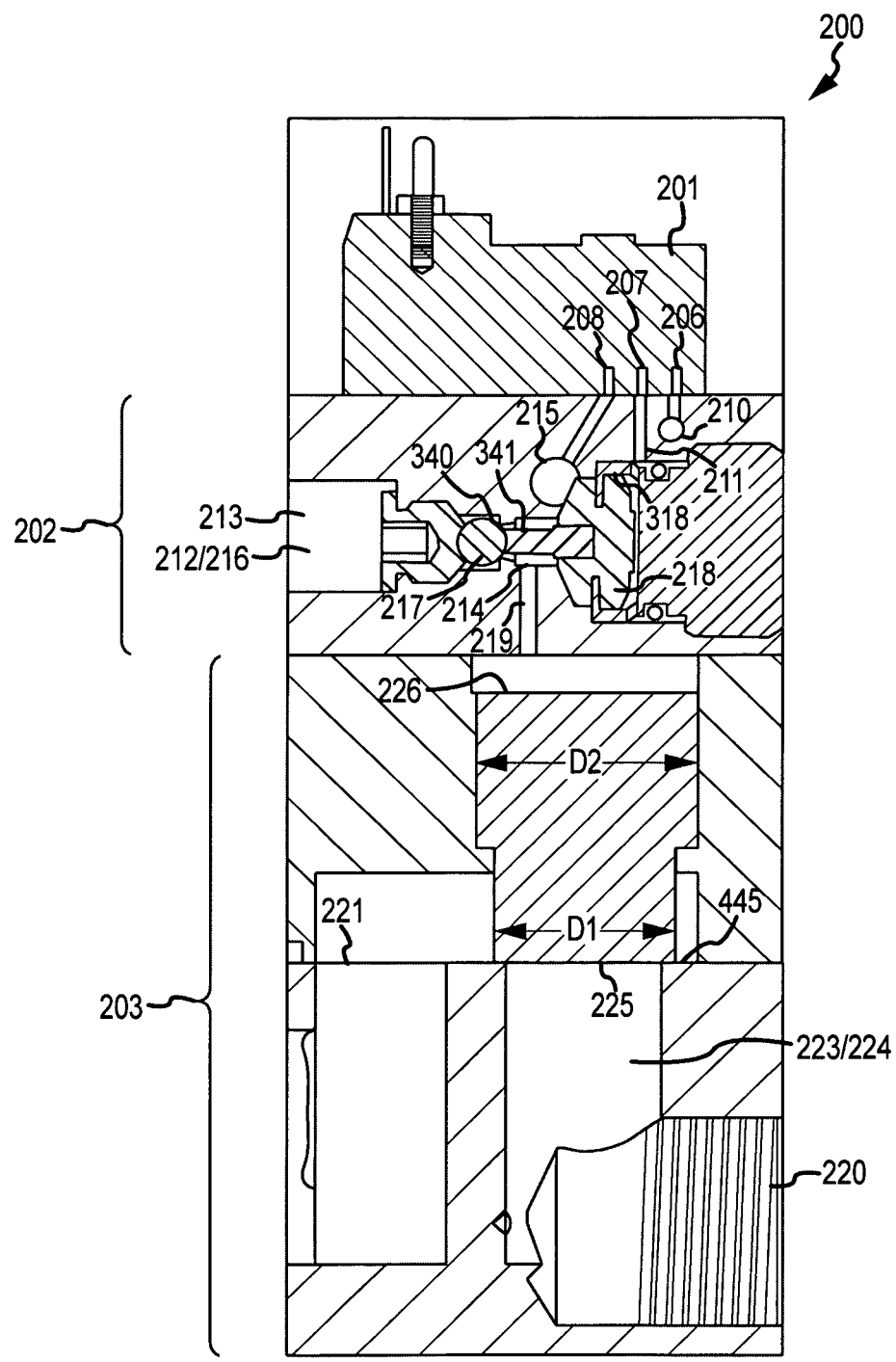
FIG. 4 shows a partial cross-sectional view of a multiple-stage valve system according to an embodiment of the invention.

FIGS. 2-4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

FIG. 2 shows a multiple-stage valve system 200 according to an embodiment of the invention. FIG. 2 shows the multiple-stage valve system 200 in schematic form and therefore, it should be appreciated that FIG. 2 provides a simplified drawing. The multiple-stage valve system 200 includes a two-stage pilot system; however, it should be appreciated that more than two pilot valves could be provided. While the multiple-stage valve system 200 is similar to the multiple-stage valve system 100 in some respects, the flow path and thus, operation of the two-stage pilot valve system 200 is improved over prior art valve systems. The multiple-stage valve system 200 utilizes a pressurized pilot fluid provided by a pilot fluid supply 209 and a pressurized process fluid provided by a process fluid supply 222. It should be appreciated that the pilot and process fluid may comprise the same type of fluid, for example air, or may comprise different fluids. While air is one type of fluid that may be used, the present invention should not be limited to pneumatic systems, but rather, the system may be used to control pneumatic systems, hydraulic systems, etc. In many embodiments, the pilot fluid will be provided at a pressure substantially less than a pressure of the process fluid. For example, in one embodiment, the pilot fluid may comprise a pressure of approximately 6 bar (87 psi) while the process fluid is supplied at a pressure of approximately 40 bar (580 psi). The particular pressures are merely examples of one embodiment and the present invention should in no way be limited to the above-mentioned pressures. In other embodiments, the pressure of the pilot fluid may be greater than or equal to the pressure of the process fluid.

According to an embodiment of the invention, the multiple-stage valve system 200 comprises a first pilot valve 201, a second pilot valve 202, and a main control valve 203. According to an embodiment of the invention, the first pilot valve 201 comprises a first stage while the second pilot valve 202 comprises a second stage of the multiple-stage valve system. In the embodiment shown, the main control valve 203 comprises a third stage of the multiple-stage valve system 200. According to one embodiment of the invention, the multiple-stage valve system 200 may be utilized for controlling a process fluid for a blow-molding system, and in particular, a stretch blow-molding system. However, it should be appreciated that the multiple-stage valve system 200 is not limited to SBM applications and rather, the present invention may be utilized in a variety of applications requiring a controlled delivery of a pressurized fluid.

According to an embodiment of the invention, the first pilot valve 201 comprises a solenoid 204 and a biasing member 205. According to an embodiment of the invention, the biasing member 205 can bias the first pilot valve 201 to a first position, while the solenoid 204 can bias the first pilot valve 201 to a second position. While the biasing member 205 is shown as comprising a biasing spring, in other embodiments, the biasing spring 205 and/or the solenoid may be replaced with another biasing device, such as a second solenoid, a different pilot pressure, a push button, a plunger, etc. Therefore, the present invention should not be limited to requiring the first pilot valve 201 to comprise a solenoid and a biasing spring 205. According to an embodiment of the invention, the first pilot valve 201 also comprises a plurality of fluid ports 206-208. In the embodiment shown, the first pilot valve 201 comprises a supply port 206, a pilot port 207, and an exhaust port 208. In the embodiment shown, the first pilot valve 201 comprises a 3/2 (three port, two position) valve; however, it should be appreciated that other configurations are certainly possible. Therefore, the present invention should not be limited to 3/2 valves. Further, while the first pilot valve 201 is shown with the pilot port 207 normally exhausted and in fluid communication with the supply port 206 when the solenoid is actuated, it should be appreciated that the orientation of the ports could be reversed, i.e., the supply port 206 could be normally in fluid communication with the pilot port 207. As shown, the pilot port 207 is selectively in fluid communication with either the supply port 206 or the exhaust port 208.

According to an embodiment of the invention, the supply port 206 provides an interface for fluid communication with a pilot supply flow path 210. It should be appreciated that the flow path 210 as well as the various additional flow paths described below may comprise conduits or internal channels formed in the valves. The pilot fluid supply flow path 210 provides a fluid communication path between a pilot fluid supply 209 and the supply port 206 of the first pilot valve 201.

According to an embodiment of the invention, the two-stage pilot valve system 200 also comprises a second pilot valve 202. According to an embodiment of the invention, the second pilot valve 202 comprises a pressure-actuated valve. The second pilot valve 202 may comprise a pressure-actuated spool valve, for example. According to the embodiment shown, the second pilot valve 202 comprises a 3/2 valve; however, other valve configurations are possible and the present invention should not be limited to a 3/2 valve. According to an embodiment of the invention, the second pilot valve 202 comprises a supply port 213, a pilot port 214, and an exhaust 215. According to an embodiment of the invention, the second pilot valve 202 also comprises first and second pressure-actuated biasing members 217, 218. In the embodiment shown, the first and second pressure-actuated biasing members comprise biasing pistons 217, 218; however, other biasing members, such as diaphragms may be used.

The second pilot valve 202 can be actuated between a first and at least a second position using the first and second pressure-actuated biasing pistons 217, 218. According to the embodiment shown in FIG. 2, the second pilot valve 202 can be actuated to a first position by supplying a pressurized process fluid from a process fluid supply 222. According to the embodiment shown, the process fluid supply 222 can communicate with the first pressure-actuated biasing piston 217 via the flow paths 223, 212, and 216. As shown, the flow path 223 provides a fluid communication path from the process fluid supply 222 to the main control valve 203. The flow path 212 branches off from the flow path 223 and provides a fluid communication path from the flow path 223 to the supply port 213 of the second pilot valve 202. The flow path 216 branches off from the flow path 212 and provides a fluid communication path from the flow path 212 to the first pressure-actuated biasing piston 217 of the second pilot valve 202 to bias the second pilot valve 202 to the first position. According to the embodiment shown, in the first position, the supply port 214 is in fluid communication with the exhaust port 215.

According to an embodiment of the invention, the second pilot valve 202 can be actuated to a second position by supplying pressurized pilot fluid to the second pressure-actuated biasing piston 218. According to the embodiment shown, in the second position, the supply port 213 is in fluid communication with the pilot port 214. Therefore, the pilot port 214 is selectively in fluid communication with either the supply port 213 or the exhaust port 215. It should be appreciated that the port configuration of the second pilot valve 202 could be reversed with the pilot port 214 being brought into fluid communication with the exhaust port 215 when the second pilot valve 202 is in the second position. Therefore, the particular configuration shown in the figures and discussed below should in no way limit the scope of the present invention.

According to an embodiment of the invention, the multiple-stage valve system 200 also comprises a main control valve 203. While the main control valve 203 is shown as comprising a 2/2 valve, it should be appreciated that the main control valve 203 may comprise other configurations, such as a 3/2 valve, for example. The main control valve 203 comprises a first port 220 and a second port 221. The first port 220 is in fluid communication with the process fluid supply 222 via the flow path 223. The second port 221 can be in fluid communication with a process fluid receiving device (not shown), such as a SBM cavity, for example. The second port 221 is also selectively in fluid communication with the first port 220 depending on the position of the main control valve 203. According to an embodiment of the invention, the main control valve 203 also comprises first and second pressure-actuated biasing members, such as biasing pistons 225, 226. As discussed above, the first and second pressure-actuated biasing members do not have to comprise pistons, but other components, such as diaphragms, may be used. According to an embodiment of the invention, a flow path 224 provides a fluid communication path between the process fluid supply flow path 223 and the first pressure-actuated biasing piston 225. Therefore, the first pressure-actuated biasing member 225 is in fluid communication with the process fluid supply 222.

In operation, the first and second pilot valves 201, 202 can be actuated to control the actuation of the main control valve 203. When the solenoid 204 is de-actuated, the biasing member 205 biases the first pilot valve 201 to a first position. According to the embodiment shown, in the first position, the supply port 206 and the pilot port 207 of the first pilot valve 201 are not in fluid communication with one another. Rather, the pilot port 207 is in fluid communication with the exhaust port 208. As a result, fluid pressure in the flow path 211 that is acting on the second pressure-actuated biasing piston 218 of the second pilot valve 202 is exhausted. Although the pilot fluid acting on the second pressure-actuated biasing piston 218 is exhausted, process fluid is supplied to the first pressure-actuated biasing piston 217. With the pressure acting on the second pressure-actuated biasing piston 218 of the second pilot valve 202 exhausted, the second pilot valve 202 can be actuated to a first position by the pressurized process fluid acting on the first pressure-actuating biasing piston 217. As can be seen, when process fluid is supplied by the process fluid supply, the process fluid can flow through the flow paths 223, 212, and 216 to act on the first pressure-actuated biasing piston 217.

According to the embodiment shown, with the second pilot valve 202 in the first position, the supply port 213 is closed off from the pilot port 214. The pilot port 214 is in fluid communication with the exhaust port 215. As a result, fluid in flow path 219 can exhaust. According to an embodiment of the invention, with the fluid in the flow path 219 exhausted, the force created by the process fluid supplied to the first pressure-actuated biasing piston 225 of the main control valve 203 easily biases the main control valve 203 to a first position. As can be seen in the embodiment shown, the force acting on the first pressure-actuated biasing piston 225 is provided by pressurized process fluid in flow path 224, which branches off from the process fluid flow path 223. Therefore, the process fluid, which is also controlled by the main valve 203, acts on the first pressure-actuated biasing piston 225 to actuate the main control valve 203 to the first position. According to one embodiment of the invention, in the first position, the main control valve 203 provides a fluid communication path between the first and second ports 220, 221. Therefore, the process pressure may act on a device in fluid communication with the main control valve 203. According to other embodiments, the main control valve 203 may be configured, such that in the first position, fluid communication is substantially closed off between the first and second ports 220, 221. Therefore, the present invention should not be limited to embodiments where the first position of the main control valve 203 provides a fluid communication path between the first and second ports 220, 221, i.e., the main control valve 203 is not limited to a normally open valve.

According to an embodiment of the invention, in order to actuate the main control valve 203 to the second position, the first pilot valve 201 can be actuated to a second position. According to one embodiment, the first pilot valve 201 can be actuated to the second position by actuating the solenoid 204; however, as discussed above, the first pilot valve 201 may be actuated using other well-known actuators. Upon actuating the solenoid 204, the first pilot valve 201 is actuated to a second position. According to the embodiment shown, in the second position, the supply port 206 and the pilot port 207 are brought into fluid communication with one another. Therefore, pressurized pilot fluid provided by the pilot fluid supply 209 is supplied through the first pilot valve 201 and the flow path 211 to the second pressure-actuated biasing piston 218 of the second pilot valve 202. According to an embodiment of the invention, the second pressure-actuated biasing piston 218 can be sized such that the pilot fluid acting on the second pressure-actuated biasing piston 218 creates a force greater than the force created by the process fluid acting on the first pressure-actuated biasing piston 217. Therefore, with the pilot fluid acting on the second pressure-actuated biasing piston 218, the second pilot valve 202 can be actuated to the second position.

According to an embodiment of the invention, with the second pilot valve 202 actuated to the second position, the process fluid is supplied from the supply port 213 to the pilot port 214. The process fluid flows through the second pilot valve 202 to the flow path 219 where the process fluid is supplied to the second pressure-actuated biasing piston 226 of the main control valve 203. According to an embodiment of the invention, the first and second pressure-actuated biasing pistons 225, 226 of the main control valve 203 can be selected such that when the pressurized process fluid acts on both the first and second pressure-actuated biasing pistons 225, 226, the main control valve 203 can be actuated to a second position. For example, the second pressure-actuated biasing piston 226 may have a cross-sectional area greater than a cross-sectional area of the first pressure-actuated biasing piston 225. In the embodiment shown, when the main control valve 203 is in the second position, the main control valve 203 closes off fluid communication between the first and second ports 220, 221.

It should be appreciated that the multiple-stage valve system 200 of the present invention advantageously utilizes the process fluid to actuate the second pilot valve 202 to the second position. Similarly, the process fluid is used to actuate the main control valve 203 to the first and second positions. Because the process fluid is utilized to act on both the first and second pressure-actuated biasing pistons 225, 226 of the main control valve 203, the ratio of the cross-sectional areas of the first and second pistons 225, 226 can remain constant substantially independent of the process fluid pressure. This is in contrast to prior art systems, such as the prior art valve system 100 that can only be operated in limited pressure ranges due to the cross-sectional areas of the biasing pistons 225, 226. In addition, the cross-sectional areas of the biasing pistons 225, 226 can be substantially reduced because the same pressure or substantially the same pressure acts on both biasing pistons 225, 226. Therefore, the overall size of the valve block associated with the main control valve 203 can be substantially reduced.

FIGS. 3 & 4 show a partial cross-sectional view of a multiple-stage valve system 200 according to an embodiment of the invention. In FIG. 3, a plurality of valve systems are shown, which are coupled to a main valve block 330. As shown, coupled to the main valve block 330 is a plurality of first pilot valves 201A-201N. While five first pilot valves are shown, a valve block such as the valve block 330 may include any number of first pilot valves. Also shown in FIG. 3 is a partial cross-sectional view of a second pilot valve 202A. It should be appreciated that FIG. 3 shows a simplified version of the multiple-stage valve system 200 and therefore, not all of the fluid flow paths are shown. Further, it should be appreciated that the main control valve 203 is not shown in FIG. 3; however, a portion of the main control valve 203 is shown in FIG. 4.

As described above, each of the first pilot valves 201 include the supply port 206, the pilot port 207, and the exhaust port 208. Also shown in FIG. 3 is a plurality of electrical contacts 331. The electrical contacts 331 can be coupled to a power source to supply power to the solenoid 104 of the first pilot valve 201, for example. Based on the actuation of the solenoid 104, the pilot port 207 can be in fluid communication with either the supply port 206 or the exhaust port 208. The supply port 206 is also in fluid communication with the flow path 210, which can be coupled to the pilot fluid supply 209.

According to the embodiment shown in FIGS. 3 & 4, when the solenoid 104 is actuated, pilot fluid can flow through the flow path 211 to the second pressure-actuated biasing piston 218. In FIGS. 3 & 4, the second pressure-actuated biasing piston 218 also includes a diaphragm 318. The diaphragm 318 may be preferable in some embodiments because diaphragms typically cause less friction than sliding seals, such as O-ring seals, for example. However, in other embodiments, O-ring seals or some other type of sealing member may be provided. In yet other embodiments, the diaphragm 318 may comprise the only pressure-actuated biasing member and replace the piston.

Acting opposite the pilot fluid is the process fluid, which enters the second pilot valve 202 through the flow path 216. The process fluid acts on the first pressure-actuated biasing piston 217, which in FIGS. 3 & 4 comprises a ball shaped member. The pressure created by the process fluid forces the ball 217 against a piston seat 340 to create a substantially fluid tight seal. The fluid tight seal between the first pressure-actuated biasing piston 217 and the piston seat 340 closes off fluid communication between the supply port 213 and the pilot port 214.

According to an embodiment of the invention, when the first pilot valve 201 is actuated to the second position, pilot fluid is supplied to the second pressure-actuated biasing piston 218. Because the first and second pressure-actuated biasing pistons 217, 218 are coupled by a coupling member 341, the pilot fluid acting on the second pressure-actuated biasing piston 218 moves the first and second pressure-actuated biasing pistons 217, 218 to the right as shown in FIG. 3 (to the left in FIG. 4). Although the pilot fluid may be at a pressure significantly less than the pressure of the process fluid, the second pressure-actuated biasing piston 218 has a cross-sectional area substantially larger than the cross-sectional area of the first pressure-actuated biasing piston 217. Therefore, the force created by the pressurized pilot fluid acting on the second pressure-actuated biasing piston 218 is substantially larger than the force created by the pressurized process fluid acting on the first pressure-actuated biasing piston 217. Once the first and second pressure-actuated biasing pistons 217, 218 move to the right in FIG. 3 (to the left in FIG. 4), the seal between the first pressure-actuated biasing piston 217 and the piston seat 340 breaks, thereby allowing process fluid to flow from the supply port 213 to the pilot port 214 towards the second pressure-actuated biasing piston 226 of the main control valve 203. In the embodiment shown in FIGS. 3 & 4, the supply port 213 is shown combined with the flow paths 212 & 216 while the pilot port 214 is shown combined with the flow path 219.

As shown in FIG. 4, the first pressure-actuated biasing piston 225 has a cross-sectional area of D1 while the second pressure-actuated biasing piston 226 has a cross-sectional area of D2, wherein D2>D1. Therefore, although the process fluid is acting on the first pressure-actuated biasing piston 225 via flow paths 223/224, which are shown as comprising a single pathway in FIG. 4, the force created by the process fluid acting on the second pressure-actuated biasing piston 226 is greater than the force created by the process fluid acting on the first pressure-actuated biasing piston 225, as described above. Therefore, the force created by the process fluid acting on the second pressure-actuated biasing piston 226 moves the first and second pressure-actuated biasing pistons 225, 226 down, as shown in FIG. 4 to actuate the main control valve 203 to a second actuated position. According to the embodiment shown in FIG. 4, in the second actuated position, the first pressure-actuated biasing piston 225 seals against a piston seat 445 to form a substantially fluid tight seal. The substantially fluid tight seal between the first pressure-actuated biasing piston 225 and the piston seat 445 closes the fluid communication path between the first port 220 and the second port 221 of the main control valve 203.

According to an embodiment of the invention, in order to actuate the main control valve 203 back to the first position, the first pilot valve 201 is actuated back to the first position. In some embodiments, the first pilot valve 201 is actuated back to the first position by de-actuating the solenoid 104. With the solenoid 104 de-actuated, the pilot fluid acting on the second pressure-actuated biasing piston 218 is exhausted through exhaust port 208. As the pilot fluid is exhausted, the process fluid acting on the first pressure-actuated biasing piston 217 forces the first and second pressure-actuated biasing pistons 217, 218 to the right as shown in FIG. 4 (to the left in FIG. 3). As the first pressure-actuated biasing piston 217 moves to the right in FIG. 4, the first pressure-actuated biasing piston 217 once again seals against the piston seat 340 to form a substantially fluid tight seal. According to an embodiment of the invention, the first pressure-actuated biasing piston 218 also moves to the right in FIG. 4 to unseat from the exhaust port 215 thereby allowing fluid in flow path 219 and acting on the second pressure-actuated biasing piston 226 to exhaust. In the embodiments shown in FIGS. 3 & 4, the exhaust port 208 and the exhaust port 215 exhaust through a common opening. It should be appreciated that in other embodiments, each exhaust port may comprise a separate and distinct opening.

As the process fluid acting on the second pressure-actuated biasing piston 226 is exhausted, the process fluid acting on the first pressure-actuated biasing piston 225 can move the first and second pressure-actuated biasing pistons 225, 226 up as shown in FIG. 4 to unseat the first pressure-actuated biasing piston 225 from the piston seat 445. As the first pressure-actuated biasing piston 225 unseats from the piston seat 445, the process fluid can flow from the first port 220 to the second port 221 to a desired device.

It should be appreciated that while the above-described embodiment provides a normally open main control valve 203, it is well within the scope of the present invention to provide a normally closed control valve 203. Further, the particular orientations shown in the figures and described should in no way limit the scope of the present invention as the orientations and configurations may be adjusted depending on the particular application. It should be appreciated that the present invention may be utilized in applications other than use in SBM applications.

The present invention as described above provides a multiple-stage valve system 200 that utilizes two or more pilot valves in order to actuate a main control valve. Rather than actuating the second pilot valve and the main control valve with pilot fluid as in the prior art, the second pilot valve 202 is actuated to a first position with pilot fluid and a second position with process fluid. The second pilot valve 202 therefore, controls the flow of the process fluid to the main control valve 203 rather than controlling the flow of the pilot fluid to the main control valve 203. Further, the main control valve 203 is actuated between the first and at least second positions using process fluid rather than actuating to one of the two or more positions with pilot fluid. As a result, the main control valve can be manufactured with first and second pressure-actuated biasing pistons 225, 226 that can be used over a wide range of operating process pressures. This is because substantially regardless of the process pressure, substantially the same pressure is acting on both the first and second pressure-actuated biasing pistons 225, 226. Therefore, so long as one of the biasing pistons 225, 226 comprises a larger cross-sectional area, the ratio of cross-sectional areas between the two biasing pistons 225, 226 does not have to be adjusted for variations between the pilot fluid pressure and the process fluid pressure.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other valve systems, and not just to the embodiments described above and shown in the accompanying figures. Accordingly, the scope of the invention should be determined from the following claims.

I claim:

1. A multiple-stage valve system (200) including a pilot fluid supply (209) and a process fluid supply (222), the multiple-stage valve system (200) comprising:
   a first pilot valve (201) including a first port (206) in fluid communication with the pilot fluid supply (209) and a second port (207) selectively in fluid communication with the first port (206);
   a biasing member (205) adapted to bias the first pilot valve (201) towards a first position and a solenoid (204) adapted to bias the first pilot valve (201) towards a second position;
   a second pilot valve (202) including:
   a first port (213) in fluid communication with the process fluid supply (222);
   a second port (214) selectively in fluid communication with the first port (213);
   a first pressure-actuated biasing member (217) in fluid communication with the process fluid supply (222);
   a second pressure-actuated biasing member (218) in fluid communication with the second port (207) of the first pilot valve (201);
   a main control valve (203) including:
   a first port (220) in fluid communication with the process fluid supply (222);
   a second port (221) selectively in fluid communication with the first port (220);
   a first pressure-actuated biasing member (225) in fluid communication with the process fluid supply (222); and
   a second pressure-actuated biasing member (226) in fluid communication with the second port (214) of the second pilot valve (202), wherein the second pressure-actuated biasing member (226) is configured to maintain a force that is a constant ratio in relation to a force maintained by the first pressure-actuated biasing member (225), wherein the constant ratio is substantially independent of the process fluid pressure.

2. The multiple-stage valve system (200) of claim 1, wherein the first pilot valve (201) further includes a third port (208) selectively in fluid communication with the second port (207).

3. The multiple-stage valve system (200) of claim 1, wherein the second pilot valve (202) further includes a third port (215) selectively in fluid communication with the second port (214).

4. The multiple-stage valve system (200) of claim 1, further comprising a flow path (224) in fluid communication with both the first pressure-actuated biasing member (225) of the main control valve (203) and a process fluid flow path (223) in fluid communication with the process fluid supply (222), wherein the flow path (224) branches off from the process fluid flow path (223) at a point between the process fluid supply (222) and the main control valve (203).

5. The multiple-stage valve system (200) of claim 1, wherein the first pressure-actuated biasing member (217) of the second pilot valve (202) comprises a cross-sectional area smaller than a cross-sectional area of the second pressure-actuated biasing member (218) of the second pilot valve (202).

6. The multiple-stage valve system (200) of claim 1, wherein the first pressure-actuated biasing member (225) of the main control valve (203) comprises a cross-sectional area smaller than a cross-sectional area of the second pressure-actuated biasing member (226) of the main control valve (203).

7. A method for controlling a main control valve of a multiple-stage valve system including a pilot fluid supply and a process fluid supply, comprising steps of:
   actuating a first pilot valve to a first position;
   exhausting pilot fluid in fluid communication with a second pressure-actuated biasing member of a second pilot valve through the first pilot valve;
   supplying process fluid from the process fluid supply to a first pressure-actuated biasing member of the second pilot valve to actuate the second pilot valve to a first position, wherein the second pressure-actuated biasing member is configured to maintain a force that is a constant ratio in relation to a force maintained by the first pressure-actuated biasing member, wherein the constant ratio is substantially independent of a pressure of the process fluid supply;

exhausting process fluid in fluid communication with a second pressure-actuated biasing member of the main control valve through the second pilot valve; and supplying process fluid from the process fluid supply to a first pressure-actuated biasing member of the main control valve to actuate the main control valve to a first position.

8. The method of claim 7, further comprising a step of communicating the process fluid supply from a first port of the main control valve to a second port of the main control valve when the main control valve is in the first position.

9. The method of claim 7, further comprising a step of:

actuating the first pilot valve to a second position to open a fluid communication path from the pilot fluid supply to the second pressure-actuated biasing member of the second pilot valve.

10. The method of claim 9, further comprising a step of:

supplying process fluid to the second pressure-actuated biasing member of the second pilot valve to actuate the second pilot valve to a second position thereby opening a fluid communication path from the process fluid supply to the second pressure-actuated biasing member of the main control valve.

11. The method of claim 10, further comprising a step of:

supplying process fluid to the second pressure-actuated biasing member of the main control valve to actuate the main control valve to a second position.

12. The method of claim 9, wherein the step of actuating the first pilot valve to the second position comprises actuating a solenoid.

13. The method of claim 7, further comprising a step of providing a flow path in fluid communication with both the first pressure-actuated biasing member of the main control valve and a process fluid flow path in fluid communication with the process fluid supply, wherein the flow path branches off from the process fluid flow path at a point between the process fluid supply and the main control valve.

* * * * *